Dec. 23, 1969     L. J. LAZARIDIS ET AL     3,485,296

FABRICATION OF STRUCTURES FOR USE AT HIGH TEMPERATURES

Filed April 17, 1967

INVENTORS
LAZAROS J. LAZARIDIS
NEIL D. VEIGEL
BY
ATTORNEYS

United States Patent Office 3,485,296
Patented Dec. 23, 1969

3,485,296
FABRICATION OF STRUCTURES FOR USE AT
HIGH TEMPERATURES
Lazaros J. Lazaridis, Canton, Mass., and Neil D. Veigel, Columbus, Ohio, assignors to Thermo Electron Engineering Corporation, Waltham, Mass., a corporation of Delaware
Filed Apr. 17, 1967, Ser. No. 631,500
Int. Cl. F28d 15/00; F28f 3/12
U.S. Cl. 165—105                                            1 Claim

ABSTRACT OF THE DISCLOSURE

Structures and methods of fabricating structures for use at high temperatures wherein tungsten is joined to silicon carbide by interposing between the two a layer of carbon. Carbon, preferably in the form of graphite, is formed into a desired shape, tungsten is deposited upon one surface of the carbon member and silicon carbide is deposited upon the opposite surface of the member to form a vacuum-tight, integral, thermal-shock resistant, oxidation-resistant structure.

---

Figures 1, 2:
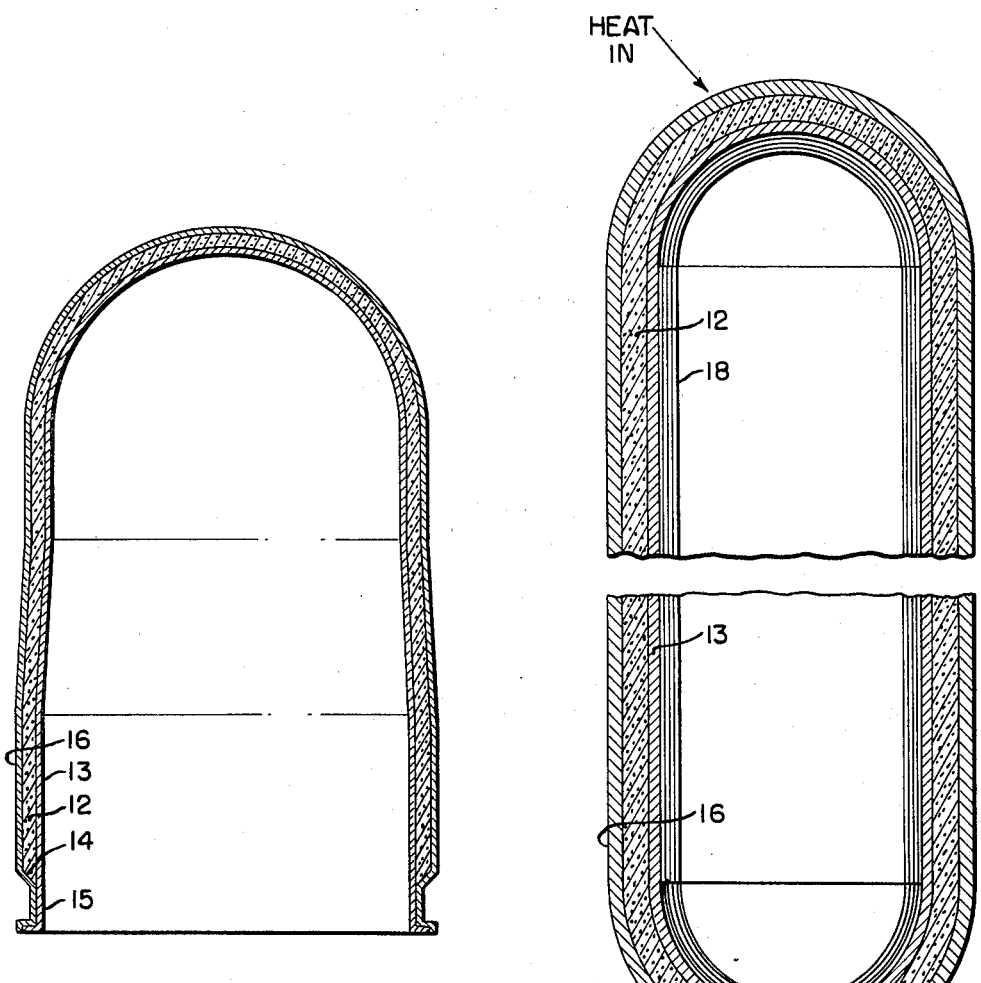

Although tungsten alone is frequently used in high temperature environments, if there is oxygen present the turgsten oxidizes and gradually is consumed. One preventive measure is the coating of the tungsten with silicon carbide. However, in certain extremely high temperature applications, a condition of spalling takes place. Although the precise mechanism causing the spalling is not completely understood, it is believed that as the temperatures of operation of the material rise to 1000° C. or more, a destructive chemical reaction takes place in which tungsten disilicide is formed at the tungsten-silicon carbide interface. With the formation of the tungsten disilicide, fractures occur and spalling results.

In the field of thermionic conversion, this problem is of vital concern, and U.S. Patent No. 3,054,914 to Hatsopoulos et al. on "Process and Apparatus for Converting Thermal Energy Into Electrical Energy" provides considerable background information on this subject. As is well known and indicated in the cited patent, a key element of a thermionic converter is the emitter. The emitter may be in the form of a layer or shell of tungsten which acts as the electron-emissive element or, alternatively, the turgsten may serve as the substrate for an electron-emissive material such as rhenium.

The emitting element is heated to extremely high temperatures ranging from 1200° C. to 1700° C. and electrons are, in a sense, boiled from the emitter to be collected by an anode.

Heat for the thermionic converter may be derived from any one of several sources such as nuclear heat sources, solar heat sources, or the combustion products from materials such as natural gas or liquid fuel. Structural considerations dictate generally that the heat be applied to one side of the emitter and that the electrons be emitted from the opposite surface. Thus, in a cylindrical configuration of an emitter, the heat might well be applied inside and electrons emitted from the outer surface of the cylinder. In other situations, and again with cylindrical configuration, the heat may be applied to the outer surface of the cylinder and the electrons emitted from the inner surface. In either case, the heat must be conducted through the emitter body which means that it is desirable to have an integral structure in which the components of the structure are bonded to each other to minimize temperature drop as heat flows through the structure.

No matter what the configuration or the disposition of heat sources and electron emitters, successful operation of a thermionic converter is dependent upon the achievement and maintenance of extremely high temperatures. At such temperatures, protection of the tungsten from oxidation and ultimate destruction can only be achieved if the protective silicon carbide remains vacuum-tight at temperatures which may range to 1400° C. or more for long periods of time. Also, of course, the silicon carbide must be able to withstand the considerable thermal shocks encountered in the raising of the emitter to operating temperatures Silicon carbide has proven to be uniquely capable of withstanding the thermal shock, but operating temperatures, the silicon carbide is not compatible with the tungsten and the protective function is lost as spalling and cracking begin.

In addition to thermionic converters, there are numerous situations in which it is necessary to protect devices and equipment from the deleterious effects of high temperature operation. For example, in a vacuum furnace, heat at extremely high temperatures is applied to the outer surface of a container which is generally made of metal. Metals or other materials are usually disposed within the container, and it is essential that the material of the container be protected from oxidation and destruction. The same is true of heat pipes, missile nose cones, the leading edges of various air frame elements and other articles too numerous to mention which are exposed to extremely high temperatures.

The principal object of the present invention is, therefore, to achieve an integral vacuum-tight thermal-shock resistant, oxidation resistant structure.

It is another object of the present invention to bond together protective material and substrates in a vacuum-tight integral composite structure.

It is still another object of the present invention to provide compatible barriers between substrates and protective materials.

It is a further object of the present invention to simplify and reduce the cost of fabrication of structures for use at high temperatures by adopting vapor deposition techniques.

It is a still further object of the present invention to facilitate the manufacture of practical thermionic converters, heat pipes, and other high-temperature equipment.

Generally, the present invention is based upon the concept of interposing a material between tungsten and silicon carbide which does not affect thermal shock resistance and which maintains compatibility between the tungsten and silicon carbide at extreme temperatures and for extended periods. To achieve this objective, a carbon substrate is shaped by machining or other forming process and a surface of the carbon member is then coated with tungsten. The tungsten is closely bonded to the surface of the carbon as by vapor-depositing the tungsten upon a surface of the carbon. Following stress relief procedures and mechanical operations, a silicon carbide coating is vapor-deposited upon the opposite surface of the carbon. In the specific case of a shell being formed for a thermionic converter emitter, the graphite may be machined in any desired configuration after which the vapor-depositions are carried out sequentially. Similar processes are followed in making heat pipes and other high temperature equipment and devices. For a better understanding of the present invention together with other and further objects, features and advantages, reference should be made to the attached drawing in which:

FIG. 1 is a view in section of a typical emitter shell for a thermionic converter, and FIG. 2 is a similar view in section of a typical heat pipe shell.

The shell shown in FIG. 1 originates as a block of carbon which may typically be somewhat greater than three inches in length and about two inches in diameter. The block is machined into a cylinder having a length of approximately three and one quarter inches and an outside diameter of somewhat less than two inches. One end of the cylinder is rounded into a hemisphere and the central portion is bored out from the opposite end. The remaining material is then in the form of a shell of approximately .040" in thickness and has the appearance of the element 12 of the drawing.

The material from which the shell is made must have a coefficient of thermal expansion comparable to that of tungsten and silicon carbide. Generally, a coefficient of thermal expansion which lies within the range of plus or minus ten percent of the coefficient of thermal expansion of silicon carbide over the temperature range encountered in operation has been found to be satisfactory. Also, the material must not be destructively chemically reactive with either tungsten or silicon carbide. Carbon has been found to be most useful and several grades of carbon have the required coefficient of thermal expansion. In particular, graphites in the RVC grade and in the ATJ grade provided by the Union Carbide Corporation satisfy these criteria.

As noted, the element 12 need not be formed by machining; other processes such as molding may be adopted although it is generally necessary to machine-finish such molded blanks. Following the machining, the member 12 is hydrogen fired, preferably at a temperature of about 800° C. and for a period of approximately ten minutes. Loose graphite may then be removed by wiping or blowing. A layer 13 of tungsten may be deposited inside the shell 12, ultimately to serve as an electron emitter itself or to serve as the substrate or matrix for electron-emissive material such as a layer of rhenium. Various means of deposition of the layer of tungsten are possible but the preferred method is deposition of the tungsten from a tungsten hexafluoride gas carried in a stream of hydrogen which may be directed upon the internal surface of the shell 12 by a pipe inserted into the member 12. To prevent deposition of tungsten on the end or outer surfaces of the member 12, a close-fitting enclosure or other masking may be utilized. Such deposition procedures are well-known. Generally, they are carried out at temperatures of approximately 550° C. until a layer of tungsten of approximately .015"–.020" thickness is built up upon the interior surface of a shell of the dimensions specified above. It has proven useful in obtaining a highly adherent and continuous coating to raise the temperature of the coated member to about 800° C. for a period of about one hour and a half after the completion of the tungsten coating. Actually, this operation is best carried out as a continuation of the tungsten coating, the flow of the tungsten-depositing gas being terminated and the temperature simply being raised to the desired point.

In the course of depositing the tungsten on the graphite, some of the tungsten may become deposited upon the end surfaces and upon the outside of the shell despite all precautions. It is generally necessary to grind away all such tungsten from the outside of the shell. Also, for reasons which will be made plainer hereinbelow, the graphite is ground back for a length of about a quarter of an inch ending in a gradual taper as seen at 14. The tungsten then extends in a layer to a point below the end of the graphite member as seen in the area 15.

To make certain that the tungsten coating is completely continuous and that no cracks or fissures exist, several checks for leaks may be made. A dye check utilizing a penetrating dye such as that known as Zyglow may be made by applying the dye to the tungsten surface and shining an infra-red light upon the material to illuminate any such discontinuities. More precise checking may be made by means of a leak detector and a probe gas such as helium. Because the carbon is porous, the passage of probe gas through the coated member indicates an opening in the tungsten coating.

Also, as an intermediate precautionary step, the coated member may be checked for dimensional accuracy at this time.

The next step is the bonding to the exterior of the shell of a coating of silicon carbide to protect the tungsten from the effects of heat to be applied in operation of the thermionic converter. Before the actual coating step, a hydrogen firing at about 1250° C. for fifteen or twenty minutes is helpful. In addition to the cleaning effect upon the coated member, the equipment in which the firing is done is purged in this step. To obtain the desired coating, however, the coated member is plugged to prevent the entry of gas into the interior and the unit is first fired in hydrogen as noted above. The temperature is maintained at about 1250° C. and methyltrichlorosilane gas together with hydrogen are introduced. Although some latitude in the ratio of the mix of the gases is possible, a figure of 97 mol percent hydrogen has proven suitable.

The flow of gas is continued until a layer 16 of silicon carbide about .010"–.030" thick is formed upon the exterior of the shell. To avoid unnecessary thermal shock to the composite structure at this point in its fabrication, the entire unit is gradually cooled. A typical cooling schedule is to lower the temperature from 1250° C. to 760° C. over a period of fifteen minutes, then to hold the unit at a temperature of 760° C. for about thirty minutes following which the unit may be cooled to 480° C. in about ten minutes and finally to permit the unit to return to room temperature gradually. A film of silicon carbide may actually extend around the end of the shell toward the interior surface and be deposited upon the tungsten. This film may be removed by simple chemical means such as electro-etching.

Techniques of vapor-forming of various materials upon substrates such as those of the present invention are described in detail in the text, Vapor Deposition by Powell, Oxley and Blocher, John Wiley, 1966.

At the base of the unit in the area 15, the silicon carbide and the tungsten are permitted to come into direct contact with each other in order that the graphite barrier may be entirely encapsulated. In the present embodiment of the invention, inasmuch as the heat applied to the unit is directed principally upon the upper exterior hemispherical portion, the temperature at the area 15 does not reach a point at which destructive reactions between the tungsten and silicon carbide can take place. Of course, in other embodiments of the invention where such temperatures may be reached, it is preferred to retain the barrier at all points between the tungsten and silicon carbide. The precise configuration of the area 15 is not critical, but it should be so formed that proper physical and/or electrical connections can be made as desired.

Emitter shells made in accordance with the present invention have been subjected to severe tests without spalling or separation of the coatings. For example, the unit has been exposed to heat at a temperature of 1400° C. for as long as one thousand hours without difficulty. Moreover, other units have been exposed to similar temperatures for hundreds of hours following which they have been thermally cycled dozens of times from room temperature to 1400° C. without deterioration. Cycling times in raising the unit from room temperature to 1400° C. have ranged from forty seconds to three minutes.

The structure illustrated in FIG. 2 is similar in many respects to that of FIG. 1. However, in this instance, a heat pipe shell rather than an emitter shell is illustrated. Protection of the heat pipe shell is essential if the heat pipe is to be operated in air, in a flame, or in contact with combustion gases just as in the case of the emitter shell described above. Heat pipes must have metallic containers for their proper operation because there must be a wetting of the heat pipe surface by the working fluid and the working fluid, frequently a liquid metal, must be compatible with the material of the container.

The illustrated heat pipe includes a basic substrate or mandrel of carbon, preferably of the type cited for use in the embodiment of FIG. 1. Tungsten is deposited in a layer 13 on the internal surface of the carbon mandrel and silicon carbide is deposited on the external surface in a layer 16. Internally of the tungsten layer, however, there is formed a plurality of capillary passages 18 which run the length of the isothermal region, in this instance the cylindrical portion of the heat pipe.

Heat pipes are a relatively recent development growing out of heat transfer requirements of nuclear reactors and thermionic converters. Their use, however, is not limited to such environments; they may be used wherever it is desired to transfer heat from a source to a receiver with minimum temperature drop. In fact, heat can be transferred around bends, over or under obstructions and in any manner comparable to the transfer of fluids by piping. Heat may also be concentrated or diffused to accommodate the heat transfer characteristics of a heat source to those of a heat receiver. In this sense, the heat pipe is analagous to an electrical transformer. Basic background on heat pipes is available in numerous references, for example, in an article by G. M. Grover et al., entitled Structures of Very High Thermal Conductance, page 1990, Journal of Applied Physics, 1964.

Numerous specific applications of the heat pipe in addition to nuclear devices and thermionic converters suggest themselves. For example, conventional heating systems may be improved by the proper use of heat pipes. The device illustrated in FIG. 2 is intended only to show a basic design of a heat pipe which can be modified to suit the need. In every case, however, the protective features of the present invention are incorporated to enhance the operation of the heat pipe.

Heat pipes may briefly be described as vapor-liquid conductors. Contained within the enclosure is a quantity of working fluid which may be a liquid metal such as potassium. The capillaries may then be formed of a material such as multiple wraps of stainless steel cloth of, for example, 200 mesh twilled weave. In the version shown in FIG. 2, heat is applied to the external top domed surface to vaporize liquid in that area. The enclosure is only partially filled with the liquid potassium and the density of the vapor decreases with temperature decrease. The vapor is driven to the lower, or cooler, end where it condenses. The combination of vapor pressure and capillary action is sufficient to overcome gravity and the condensate returns as a liquid to the top of the heat pipe to be recycled.

Of course, the teaching of the present invention may be applied to any equipment exposed to heat at temperatures ranging above approximately 1000° C. whether or not in conjunction with heat pipes. Such equipment has been listed, though incompletely, hereinabove.

Although a specific fabrication technique and particular heat resistant units have been described, various alternatives and modifications will suggest themselves to those skilled in the art upon a reading of the foregoing specification. For example, materials other than the cited types of graphite may be used to provide the compatible barrier between the tungsten and silicon carbide. The important criteria are the maintenance of a coefficient of expansion which is within plus or minus ten percent of the coefficient of expansion of the silicon carbide as well as the utilization of a substance which is not destructively chemically reactive with either the tungsten or silicon carbide. Also, the precise procedural steps may be varied while retaining the benefits of the invention. It is not essential that vapor deposition be used nor is it necessary that particular mechanical or chemical steps be taken to achieve the desired end result. Other well-known techniques are available and the substitution of such techniques is believed to be within the purview of the invention. The invention should be limited only by the spirit and scope of the appended claim.

What is claimed is:

1. An integral, composite, oxidation-resistant, thermal shock-resistant sealed enclosure comprising a formed substrate of carbon, a layer of tungsten bonded to and substantially completely covering the inside surface of said substrate, a layer of silicon carbide bonded to and substantially completely covering the outside surface of said substrate, the coefficient of thermal expansion of said carbon being within plus or minus ten percent of that of said silicon carbide, capillary members disposed adjacent the inner surface of said layer of tungsten and a quantity of working fluid disposed within said enclosure for coaction with said capillary members to form a heat pipe.

References Cited

UNITED STATES PATENTS

| | | | |
|---|---|---|---|
| 3,258,521 | 6/1966 | Francel et al. | 117—124 |
| 3,322,979 | 5/1967 | Clendinning et al. | 310—4 |

FOREIGN PATENTS

| | | |
|---|---|---|
| 899,328 | 6/1962 | Great Britain. |

ROBERT A. O'LEARY, Primary Examiner

A. W. DAVIS, Assistant Examiner

U.S. Cl. X.R.

102—105; 117—71, 107; 161—164, 165; 165—133; 310—4